(12) United States Patent
Cecchin et al.

(10) Patent No.: US 6,462,134 B1
(45) Date of Patent: *Oct. 8, 2002

(54) POLYETHYLENE COMPOSITIONS HAVING IMPROVED OPTICAL AND MECHANICAL PROPERTIES AND IMPROVED PROCESSABILITY IN THE MELTED STATE

(75) Inventors: Giuliano Cecchin, Ferrara (IT); Gianni Collina, Ferrara (IT); Massimo Covezzi, Ferrara (IT); Marco Ciarafoni, Ferrara (IT); Remo Anibaldi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/743,123

(22) PCT Filed: Jul. 2, 1999

(86) PCT No.: PCT/EP99/04596

§ 371 (c)(1),
(2), (4) Date: Jan. 5, 2001

(87) PCT Pub. No.: WO00/02961

PCT Pub. Date: Jan. 20, 2000

(30) Foreign Application Priority Data

Jul. 7, 1998 (IT) .......................................... MI98A1548

(51) Int. Cl.[7] .......................... C08L 23/00; C08L 23/04; B32B 27/00; B32B 27/08

(52) U.S. Cl. ........................ 525/191; 525/240; 428/500; 428/515; 428/516

(58) Field of Search ................................. 525/191, 240; 428/500, 515, 516

(56) References Cited

U.S. PATENT DOCUMENTS

| 4,399,054 A | | 8/1983 | Ferraris et al. ......... 252/429 B |
| 4,871,813 A | | 10/1989 | Senez .......................... 525/240 |
| 5,206,075 A | * | 4/1993 | Hodgson, Jr. ............... 428/216 |
| 5,358,792 A | * | 10/1994 | Mehta et al. ................ 428/516 |
| 5,561,195 A | * | 10/1996 | Govoni et al. .............. 525/240 |
| 5,674,945 A | | 10/1997 | Takahashi et al. .......... 525/240 |

FOREIGN PATENT DOCUMENTS

| EP | 0045977 | 2/1982 |
| WO | 9303078 | 2/1993 |
| WO | 9308221 | 4/1993 |
| WO | 9520009 | 7/1995 |

\* cited by examiner

*Primary Examiner*—Nathan M. Nutter

(57) ABSTRACT

Polyethylene composition comprising (percentages by weight): A) from 60 to 95% of an LLDPE copolymer having a density from 0.905 to 0.9 g/cm$^3$, $M_w/M_n$ values less than 4 and F/E ratio values greater than 20; B) from 5 to 40% of one or more crystalline copolymers of propylene selected from among defined copolymers of propylene with ethylene and/or higher alpha-olefins.

7 Claims, No Drawings

POLYETHYLENE COMPOSITIONS HAVING IMPROVED OPTICAL AND MECHANICAL PROPERTIES AND IMPROVED PROCESSABILITY IN THE MELTED STATE

The present invention concerns polyethylene compositions comprising a linear low-density copolymer of ethylene (LLDPE) having a narrow distribution of molecular weights, and a crystalline copolymer of propylene.

The films obtainable from the said compositions possess an excellent balance of mechanical properties and optical properties.

Moreover, the aforesaid compositions are readily processable in the melted state, since they do not require large expenditures of energy in the machines used for their processing and do not cause high pressures at the head in the machines themselves.

The copolymer of ethylene used for the compositions of the present invention possesses a molecular weight distribution, in terms of the ratio between the average ponderal molecular weight ($M_w$) and the average numerical molecular weight ($M_n$), that is in terms of $M_w/M_n$, which is particularly narrow (corresponding to values of $M_w/M_n$ less than 4) and hence typical of the polyethylenes obtained with metallocene catalysts.

In that respect, the compositions of the present invention differ from the compositions described in the published patent applications WO 93/03078 and WO 95/20009, in which the LLDPE copolymer (which is mixed with a crystalline copolymer of propylene) is prepared with Ziegler-Natta catalysts and hence possesses values of $M_w/M_N$ typically greater than or equal to 4.

According to the U.S. Pat. No. 4,871,813, it is possible to prepare LLDPE copolymers having $M_w/M_n$ values less than 4 (from 2.5 to 6) even when the catalyst used is of the Ziegler-Natta type, however in the examples only an LLDPE copolymer having a $M_w/M_n$ value of 4 is used.

Also in the cited US patent the LLDPE copolymer is mixed with a copolymer of propylene, however the crystallinity of that copolymer of propylene is rather low, as is indicated by the low values of the enthalpy of fusion (less than or equal to 75 J/g) and, in particular, the degree of crystallinity (less than 35%).

The aforesaid documents show that by the addition of the copolymer of propylene to the LLDPE copolymer, polyethylene compositions having improved processability in the melted state, in the aforesaid sense, are obtained.

According to the U.S. Pat. No. 4,871,813, this effect is obtained without substantially changing the optical and mechanical properties of the film, compared to those of a film obtained from the pure LLDPE copolymer.

According to the published patent application WO 95/20009, as well as improving the processability in the melted state, the addition of the crystalline copolymer of propylene is capable of improving the resistance of the polyethylene film to impact and to tearing.

However, the optical properties of the compositions comprising an LLDPE copolymer obtained with Ziegler-Natta catalysts and a copolymer of propylene are inferior, in particular as regards the haze and gloss values, to those typical of an LLDPE copolymer obtained with metallocene catalysts and having relatively high F/E ratio values, i.e. greater than 20.

The aforesaid LLDPE copolymers obtained with metallocene catalysts in general show haze values less than ca. 20% and gloss values greater than ca. 30% (measured on blown film of thickness 25 µm by the method described in the examples).

Corresponding to the said high haze and gloss values, such LLDPE copolymers also possess satisfactory impact resistance (Dart Test) and tear resistance (Elmendorf) values.

However, the LLDPE copolymers obtained with metallocene catalysts display unsatisfactory processability in the melted state.

Hence, it would be particularly desirable to obtain polyolefin compositions having the aforesaid optical properties, with the best balance possible of impact resistance and tear resistance and good processability in the melted state.

In the U.S. Pat. No. 5,674,945, polyethylene compositions comprising an LLDPE copolymer obtained with metallocene catalysts and a copolymer of propylene having a density greater than or equal to 0.900 $g/cm_3$ are described.

In particular, in the examples a copolymer containing 0.2 mol % of butene and a copolymer containing 3.4 mol % of ethylene and 1.6 mol % of butene are used.

In both cases, the relative quantity of propylene copolymer in the polyethylene compositions is 10% by weight, and the transparency of the films obtained from such compositions is found to be substantially unchanged compared to the transparency of the films obtained from the corresponding LLDPE copolymers in the pure state.

Moreover, the films obtained from the aforesaid compositions show high tensile modulus values, superior to those of the films obtained from the corresponding LLDPE copolymers in the pure state, and high breaking strain values.

The technical problem consisting in the obtention of excellent balances of optical properties, impact resistance and tear resistance is not considered.

Polyethylene compositions have now been created which fully satisfy the aforesaid requirements, thanks to an unusual and particularly favourable balance of mechanical and optical properties and processability in the melted state.

Hence the object of the present invention is constituted by polyethylene compositions comprising (percentages by weight):

A) from 60 to 95%, preferably from 60 to 90%, more preferably from 70 to 88%, of a copolymer of ethylene with an alpha-olefin $CH_2=CHR$, in which R is an alkyl radical containing from 1 to 18 atoms of carbon (LLDPE copolymer), the said copolymer having a density from 0.905 to 0.935 $g/cm^3$, preferably from 0.910 to 0.930, more preferably from 0.915 to 0.925 $g/cm^3$ (measured according to ASTM D 4883), $M_w/M_n$ values less than 4, preferably from 1.5 to 3.5, more preferably from 1.5 to 3 (measured by GPC, i.e. gel permeation chromatography) and F/E ratio values greater than 20, preferably from 25 to 70, more preferably from 25 to 50 (measured according to ASTM D 1238);

B) from 5 to 40%, preferably from 10 to 35%, more preferably from 12 to 30%, of one or more crystalline copolymers of propylene selected from among (i) copolymers of propylene with ethylene containing from 3 to 8%, preferably from 4 to 6%, of ethylene; (ii) copolymers of propylene with one or more alpha-olefins $CH_2=CHR^I$, where $R^I$ is an alkyl radical having from 2 to 8 carbon atoms or an aryl radical, containing from 6 to 25%, preferably from 8 to 20%, of alpha-olefins $CH_2=CHR^I$; (iii) copolymers of propylene with ethylene and one or more alpha-olefins $CH_2=CHR^I$, where $R^I$ has the aforesaid meaning, containing from 0.1 to 8%, preferably from 0.5 to 5%, more preferably from 1 to 4%, of ethylene, and from 0.1 to 20%, preferably from 1 to 15%, more preferably from 2.5 to 15%, in particular from 2.5 to 10%, of alpha-olefins $CH_2=CHR^I$, on condition that the total content of ethylene and alpha-olefins $CH_2=CHR^I$ in the copolymers (iii) is greater than or equal to 5%.

Optionally, in order to improve the optical properties, the compositions of the present invention can contain, in addition to the components A) and B), from 0.5 to 10%, preferably from 1 to 6%, by weight of an LDPE polyethylene (component C), relative to the total weight of A) +B) +C).

As seems clear from the foregoing description, polymers containing two or more types of comonomers are also included in the definition of copolymers.

The aforesaid compositions are generally characterized by haze values less than or equal to 25%, preferably less than or equal to 20%, in particular between 20 and 5%, and gloss values greater than ca. 30%, in particular between 30 and 60% (measured on blown film of thickness 25 $\mu$m by the method described in the examples).

Moreover, the compositions of the present invention are generally characterized by dart test values greater than or equal to 150 g, preferably greater than or equal to 200 g, in particular between 150 and 400 g, preferably between 200 and 400 g (measured on blown film of thickness 25 $\mu$m by the method described in the examples).

Moreover, the compositions of the present invention show particularly high tear resistance values (Elmendorf), both as such and in consideration of the dart test values. Generally, such values are greater than or equal to 400 g (measured on blown film of thickness 25 $\mu$m by the method described in the examples) in the transverse direction (TD), in particular between 400 and 800 g, and greater than or equal to 150 g in the machine direction (MD), preferably greater than or equal to 200 g, in particular between 150 and 350 g, preferably between 200 and 350 g.

Generally, the component A) of the compositions of the present invention has an ethylene content greater than or equal to 60% by weight, in particular from 60 to 99%, preferably greater than or equal to 70% by weight, in particular from 70 to 99%, more preferably greater than or equal to 80% by weight, in particular from 80 to 99%.

Examples of alpha-olefins $CH_2=CHR$ present in the component A) of the compositions of the present invention are propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

Preferred examples are 1-butene, 1-hexene and 1-octene.

Generally, the component A) possesses melt flow rate E values (MFR E according to ASTM D 1238) from 0.1 to 100 g/10 min. Moreover, the said component A) preferably possesses a content of fraction soluble in xylene at 25° C. less than or equal to 5% by weight.

The DSC (Differential Scanning Calorimetry) trace of the said component A) preferably shows a single melting peak (typical of one crystalline phase); this peak is generally situated at a temperature greater than or equal to 100°0 C.

The LLDPE copolymers having the characteristics quoted above for the component A) are known in the art and can be obtained by conventional polymerization processes (in gas phase, in suspension or in solution) using catalysts comprising a compound of a transition element, preferably Ti, Zr or Hf, or from the lanthanide series, wherein this element is bound to at least one cyclopentadienyl group, and a cocatalyst, in particular an alumoxane or a compound capable of forming an alkyl cation.

Examples of the aforesaid catalysts and polymerization processes are described in the published patent application WO 93/08221.

Examples of alpha-olefins $CH_2=CHR^I$ present in the component B) of the compositions of the present invention are 1-butene, 1-pentene, 4-methylpentene-1, 1-hexene and 1-octene. 1-butene is preferred.

Generally, the component B) has melt flow rate L values (MFR L according to ASTM D 1238) from 0.1 to 500 g/10 min, preferably from 1 to 50, more preferably from 6 to 25 g/10 min.

Preferably the said component B) has density values (measured according to ASTM D 4883) less than 0.9 g/cm$^3$, in particular from 0.890 to 0.899, more preferably from 0.892 to 0.899.

Moreover, the said component B) preferably possesses the following characteristics:

content of fraction insoluble in xylene at 25° C. greater than 70% by weight, more preferably greater than or equal to 75%, in particular greater than or equal to 85% by weight;

enthalpy of fusion (measured according to ASTM D 3418-82) greater than 50 J/g, more preferably greater than or equal to 60 J/g, in particular greater than or equal to 70 J/g, for example from 75 to 95 J/g;

melting point (measured according to ASTM D 3418-82) less than 140° C., more preferably from 120 to 140° C.;

$M_w/M_n$ values greater than 3.5, in particular from 3.5 to 15.

The crystalline copolymers of propylene having the characteristics quoted above for the component B) are known in the art, and can be obtained by conventional polymerization processes using stereospecific Ziegler-Natta catalysts supported on magnesium halides. Such catalysts contain, as an essential component, a solid catalytic component comprising a compound of titanium having at least one titanium-halogen bond and one electron-donor compound, both supported on a magnesium halide. As cocatalysts, an Al-alkyl compound and an electron-donor compound are generally used.

Catalysts having the aforesaid characteristics are for example described in the U.S. Pat. No. 4,399,054 and in the European patent 45977.

The LDPE polymer (low density polyethylene) constituting the component C) of the compositions of the present invention is a homopolymer of ethylene or a copolymer of ethylene containing smaller quantities of comonomers, such as butyl acrylate, prepared by polymerization at high pressure using free radical initiators.

The density of the said LDPE polymer generally ranges from 0.910 to 0.925 g/cm$^3$ (measured according to ASTM D 4883).

The MFR E values of the said LDPE polymer generally range from 0.1 to 50 g/10 min, preferably from 0.3 to 20 g/10 min.

The LDPE polymers having the characteristics quoted above for the component C) are known in the art. Specific examples are the commercially available polymers with the brand names Escorene, and Lupolen (BASF).

In addition to the aforesaid components, the compositions of the present invention can contain other polymeric components, such as olefin elastomers, in particular ethylene/propylene (EPR) or ethylene/ propylene/diene (EPDM) elastomers, and additives commonly used in the art, such as stabilizers (in particular phenolic antioxidants and process stabilizers such as the organic phosphites), pigments, fillers, nucleating agents, release agents, lubricating and antistatic agents, flame retardants and plasticizers.

The compositions of the present invention can be prepared by processes of polymerization in two or more consecutive stages, using in at least one stage the catalysts described above for the preparation of the component A) and in at least one other stage the Ziegler-Natta catalysts described above for the preparation of the component B), and optionally adding the component C) by mixing in the melted state.

Naturally, it is also possible to prepare the compositions of the present invention by mixing of the components A), B), and optionally C), in the melted state.

The processes of mixing in the melted state advantageously used are of conventional type and are based on the use of mixing devices known in the art, such as single-screw and double-screw extruders.

In view of their ready processability in the melted state and their excellent optical and mechanical properties, the compositions of the present invention are particularly suitable for the preparation of moulded articles in general, and in particular of film, monolayer or multilayer, whether cast or mono- or biaxially oriented, including blown films, in which at least one layer comprises the aforesaid compositions.

The processes for the preparation of blown film are well known in the art and comprise a stage of extrusion through a head with an annular aperture.

The product from this stage is a tubular extrudate which is then inflated with air,- to obtain a tubular bubble which is cooled and collapsed to obtain the film.

The following examples are given in order to illustrate but not to limit the present invention.

For these examples, the following materials are used:
A) LIMPE Copolymer Ethylene/1-octene copolymer, marketed by DOW CHEMICAL COMPANY under the name "Affinity-1570", containing 10.8% by weight of I-octene (determined by $^{-}$C NMR) and having the following characteristics:

Density (ASTM D 4883): 0.9130 g/CM$^3$ $M_w/M_n$ (GPC): ca. 2.5

MFR E (ASTM D 1238): 1.0 g/10 min

F/E (ASTM D 1238): 41

Soluble in xylene at 25° C. (% by wt): 3.2
B) Crystalline Propylene Copolymer

A propylene copolymer having the following characteristics is used:

Butene content (% wt): 5.3

Ethylene content (% wt): 2.2

Density (g/cm$^3$): 0.895

MFR L (g/10 min): 6

Soluble in xylene at 250° C. (% wt): 10
Note: The aforesaid contents of butene and ethylene are measured by IR spectroscopy, the density by ASTM D 4883, and the content insoluble in xylene (and hence the content soluble) is determined by the following method:

2.5 g of copolymer together with 250 cm$^3$ of o-xylene are placed in a conical glass flask, equipped with condenser and magnetic stirrer. The temperature is raised until the boiling point of the solvent is reached in 30 min. The clear solution thus formed is left at reflux with stirring for another 30 min. The closed flask is then placed in a bath of water and ice for 30 min. and then in a bath of water thermostatted at 25° C. for 30 min. The solid formed is filtered on paper at a high filtration rate. 100 cm$^3$ of the liquid obtained from the filtration are poured into an aluminium container, previously weighed, and the whole is placed on a heating plate to evaporate the liquid in a current of nitrogen. The container is then placed in an oven at 80° C. and kept under vacuum until constant weight is attained.

The aforesaid propylene copolymers are prepared using Ziegler-Natta catalysts of high yield and stereospecificity, supported on magnesium chloride, in the polymerization.

EXAMPLE 1

The aforesaid components A) and B) are mixed in the melted state in a single-screw extruder (Bandera TR-60) under the following conditions:

Temperature profile: 185, 195, 200, 205, 210, 215, 235, melted 230° C.;

Screw revolutions: 70 rpm;

Throughput: 67 kg/hr.

The relative quantities of the aforesaid components are equal to 80% by weight of A) and 20% by weight of B), relative to the total weight of the composition.

From the composition thus obtained, a blown film of 25 μm thickness is prepared using a COLLIN-25 machine under the following conditions:

Temperature profile: 155, 165, 175, 185, 190, 190, 190, 190, melted 200° C.;

Screw revolutions: 90 rpm; Throughput: 4.2 kg/h;

Blow-up ratio: 2.5.

The properties shown in Table 1 are measured on the film thus prepared. For comparison purposes, Table 1 also shows the properties of a blown film obtained and subjected to testing under the same conditions as in Example 1, but using the component A) in the pure state (Reference Example 1).

TABLE 1

| Ex. No. | 1 | Ref.1 |
|---|---|---|
| Head pressure (Mpa) | 15.9 | 18.8 |
| Motor input (A) | 6.7 | 7.2 |
| Haze (%) | 11 | 8 |
| Gloss (%) | 49 | 56 |
| Dart Test (g) | 252 | 480 |
| Elmendorf | | |
| TD (g) | 510 | 545 |
| MD (g) | 220 | 215 |

With reference to Table 1, the head pressure corresponds to the pressure measured at the head of the extruder while the motor input relates to the extruder motor.

Further, the properties of the films shown in Table 1 are measured by the following standard ASTM methods:

Haze: ASTM D 1003

Gloss: ASTM D 2457

Dart Test: ASTM D 1709

Elmendorf: ASTM D 1922.

What is claimed is:

1. Polyethylene composition comprising (percentages by weight):
    A) from 60 to 95% of a copolymer of ethylene with an alpha-olefin CH$_2$=CHR, wherein R is an alkyl radical containing from 1 to 18 atoms of carbon, the said copolymer having a density from 0.905 to 0.935 g/cm$^3$, $M_w/M_n$ values less than 4, and F/E ratio values greater than 20;
    B) from 5 to 40% of one or more crystalline copolymers of propylene selected from among (i) copolymers of propylene with ethylene containing from 3 to 8% of ethylene; (ii) copolymers of propylene with one or more alpha-olefins CH$_2$=CHR$^I$, where R$^I$ is an alkyl radical having from 2 to 8 carbon atoms or an aryl radical, containing from 6 to 25% of alpha-olefins $CH_2=CHR^I$; (iii) copolymers of propylene with ethylene and one or more alpha-olefins $CH_2=CHR^I$, where $R^I$ has the aforesaid meaning, containing from 0.1 to 8% of ethylene and from 0.1 to 20% of alpha-olefins $CH_2=CHR^I$, on condition that the total content of ethylene and alpha-olefins $CH_2=CHR^I$ in the copolymers (iii) is greater than or equal to 5%.

2. The polyethylene composition of claim 1 containing, in addition:

C) from 0.5 to 10% by weight, relative to the total weight of A)+B)+C), of LDPE polyethylene.

3. The polyethylene composition of claim 1, wherein the component B) has a density less than 0.900 $g/cm^3$.

4. The polyethylene composition of claim 1, wherein the component B) has a fraction insoluble in xylene at 25° C. greater than 70% by weight.

5. The polyethylene composition of claim 1, having haze values, measured on blown film of thickness 25 μm according to ASTM D 1003, less than or equal to 25%.

6. Mono- or multilayer film, wherein at least one layer comprises the polyethylene composition of claim 1.

7. Blown film according to claim 6.

* * * * *